United States Patent Office 3,297,519
Patented Jan. 10, 1967

3,297,519
WATER DISPERSIBLE GLYCIDYL ETHER OF POLY(BISPHENOL A) ETHER OF POLYETHYLENE GLYCOL
George M. Rambosek, Maplewood, Minn., assignor to Minnesota Mining and Manufacturing Company, St. Paul, Minn., a corporation of Delaware
No Drawing. Filed Apr. 13, 1964, Ser. No. 359,439
15 Claims. (Cl. 162—164)

This invention relates to a process for rendering water insoluble materials oleophobic, to paper-maker's furnishes and to autodisperse latices of oxirane group-containing prepolymers useful in said furnishes, and to organorepellent papers.

A vast literature has developed in recent years on oxirane group-containing prepolymers, also known as epoxy or ethoxyline resins. In general these resins are of exceptional value for their stability and adhesive power after curing to cross-linked solids. The prepolymers themselves are generally viscous to resinous liquids or semisolids which are soluble in some non-polar hydrocarbon or halogenated solvents and insoluble in polar solvents such as alcohols and water.

Aqueous emulsions of combination of prepolymers having dissimilar characteristics can be made by use of suitable emulsifying agents, as shown by Schroeder, U.S. Patent No. 2,872,428; and such emulsions may be used in finishing cotton fabric to give crease resistance and water repellency. Presumably washing or scrubbing is necessary to remove the emulsifying agents employed in order to be able to realize good water repellency. A disadvantage of certain of these compositions is the use of water-soluble epoxy compounds which give relatively low strength cured products.

It is desirable to have aqueous vehicles for the treatment of textiles and for many other purposes both because of the cheapness of water and because of the absence of the hazards of toxicity and combustibility. However, an extra washing step, together with a subsequent drying step is a disadvantage.

In particular in treatments for paper, operation in aqueous media is highly desirable as such media are employed in paper making and the economics of commercial processes greatly favors the avoidance of extraneous additives and non-aqueous solvents unless such additives or solvents perform a function such that their cost is justified.

It is one object of this invention to provide an aqueous emulsion of oxirane group-containing polymer free from emulsifiers.

It is another object of this invention to provide sizes for papers for use in both acidic and basic pulps.

Another object of the invention is to provide fiber finishing compositions comprising epoxy resins.

Yet another object of the invention is to provide surface treatments for fibrous materials to promote resistance to moisture and organic materials.

Still another object of the invention is to provide paper having decreased sensitivity to humidity and moisture.

A further object of the invention is to provide a paper maker's furnish adapted to yielding paper having resistance to solvents and to other organic liquids and semi-solids.

A still further object of the invention is to provide paper having hold-out to organic materials generally and particularly having hold-out to thermoplastic organic materials such as waxes, asphalt and the like.

Other objects of the invention will become evident from the disclosure herein.

In accordance with the above and other objects of the invention it has been found that stable compositions having the character of latices are obtained directly by mixing certain oxirane group-containing prepolymers with water without the necessity of employing emulsifying agents. These compositions are herein termed autodisperse latices to emphasize the freedom from emulsifying agents and to point out their peculiar stability. The prepolymers which are employed are a very small group of glycidyl ethers of polyphenolic ethers of polyethylene glycols having the general formula:

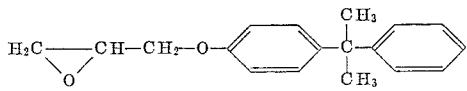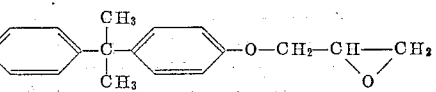

wherein the rings are aromatic and $n$ is a number from about 4 to about 45. It will be recognized that $n$ may not be an integral number on the average and that in any given compositon there will be variation over a range in the integral values of $n$ present.

The glycidyl ethers employed in the autodispere latices of the invention are prepared as described in the copending application of Carl M. Smith, Serial No. 350,524, from certain bisphenols by reaction with alkali and epichlorohydrin. These bisphenols in turn are prepared by reaction of bisphenol A with the arene sulfonate esters of polyethylene glycols having molecular weights from about 200 to about 2000.

The ability of an epoxy resin prepolymer to disperse without the use of an emulsifier is unexpected. It is moreover limited to a relatively small group of prepolymers. The bisphenols from which the instant glycidyl ethers are made lack this ability and even more surprisingly the analogous glycidyl ethers in which resorcinol is employed in place of bisphenol A also lack this ability. In the series in which $n$ is from about 4 to about 45, the ability is most pronounced when $n$ is from about 6 to about 20, tending to be less at the extremes of the series.

These autodisperse latices are to be considered as intermediates for the preparation of an entire novel genus of water-extended curable epoxy resin systems. Illustrative of such a system is a composition comprising water, a glycidyl ether as above described and a compatible cross-linking agent. Optimum effectiveness is obtained in certain instances by incorporation of catalysts, adjuvants and fillers of various types as will be apparent to those skilled in the art. A particularly preferred class of cross-linking agents is that consisting of solubilized amines containing at least about 3 fully fluorinated carbon atoms in sequence and distal to a primary amine group. Compositions comprising this preferred class of cross-linking agents are especially valuable for the preparation of oleophobic papers as is disclosed in greater detail hereinbelow.

In another embodiment of the invention the autodisperse latex including desired adjuvants and metal fluoroborates as catalysts for homopolymerization of the epoxy resin are employed in the treatment or finishing of fibrous materials, such as papers, textiles, non-woven webs and the like, or of particulate materials to enhance stability toward moisture and chemicals alter feel or hand, and to give "wash-and-wear" type characteristics to textiles and to discardable paper fabrics. In such compositions a nitrogenous base may be included as an adjuvant if desired so that cross-linking of the epoxy resin is also effected.

In referring herein to paper, reference is had to paper-like materials without qualification as to thickness. It will readily be recognized that pulps are readily adapted to the formation of tissues, paper, paper board, molded pulp products and other such paper products. In general, cellulosic fibers are employed because of ready availability and low cost but the presence of other fibers is not generally precluded. Paper produced employing my invention containing oleophobic perfluoroalkyl groups are useful for holdout to organic liquids such as solvents and oils, to semi-solid fats and greases of both glyceride and hydrocarbon types and to thermoplastic materials such as asphalt wax, and synthetic thermoplastic resins. Such papers are useful, for example, in the manufacture of containers for oil and grease, pouches and bags for packaging food stuffs, including food for animal consumption, wax holdout for laminating or overwrap grades, specialized products for both civilian and military equipment, milk cartons, printing stock for menus, machine catalogs, labels, processing cards, envelopes etc. where stain prevention is desirable, sheets for duplicating products such as carbon paper and papers having reactive coatings, garbage bags, car liners, drop cloths and separator sheets, for example, for slightly oily metals. Numerous other specific fields of utility will become apparent to those skilled in the art.

The autodisperse latices are readily prepared by combining desired proportions of the selected glycidyl ether and water and stirring together (at 20° to 60° C. for about 10 to 15 minutes). These latices are stable over prolonged periods without the addition of emulsifying agents or protective colloids. They can be precipitated, as can many latices, for example, by the addition of salts such as sodium chloride.

It will be recognized that at low pH values (e.g. 1–2 or lower) acids such as hydrochloric, hydrobromic and the like may effect fission of the oxirane ring of the glycidyl ethers thereby destroying the ability of the compounds of the latices to react with curing agents. In general these latices as prepared and employed have pH values of from about 3 to 10 and preferably from about 4 to 9.

Latices may be prepared to have concentrations of up to about 20 percent dry weight of the glycidyl ether in hot water and up to about 10 percent in water at 25° C. Dilution of more concentrated solutions provides dilute latices for use in fields where rather dilute treating solutions are needed, for example, with the preferred class of cross-linking agents as beater additives in paper-making when no reclaim of spent fluid, i.e. white waters, is attempted. More concentrated solutions are employed where relatively large amounts of resin are to be incorporated as in the padding of textiles.

Generally the latices of the invention are useful in treating fibers adapted for materials such as woven and non-woven webs, e.g., paper, textiles, and the like.

Compatible curing agents include catalysts which effect autopolymerization of the glycidyl ethers such as the metal fluoroborates as well as cross-linking agents which have greater ease of reactivity with glycidyl ethers than with water and are dispersed in water. Thus, anhydrides are generally inoperative as such, although the corresponding acids may be employed if sufficiently soluble in water. Compounds and compositions including two or more hydroxyl groups may also be employed.

The preferred class of curing agents are nitrogenous cross-linking agents which are water dispersible. Among such compounds are the relatively water-soluble lower alkylene diamines and polyamines, ethylene diamine, diethylene triamine, triethylene tetramine and the like, hexamethylene diamine and the like, and bisalkarylamines such as metaxylylene diamine and the like which are readily dispersed in water as salts.

A preferred subclass of nitrogenous curing agents comprises distally perfluoroalkyl amines having linking groups consisting of at least one divalent radical selected from the group consisting of alkylene of 1 to 12 carbon atoms, aralkylene of 8 carbon atoms, oxa, unsubstituted aza, carbonamido, unalkylated sulfonamido and N-alkyl-sulfonamido, at least one of said radicals being alkylene, not more than two of said radicals comprising amide linkages and not more than one being aralkylene, and sulfonamido groups, when present, having the sulfur atoms distally located in said divalent radical relative to the attachment of the amine group.

One class of distally perfluoroalkyl amines comprises amines of the formula $R_fR_2NH_2$ wherein $R_f$ is perfluoroalkyl of 4 to 12 carbon atoms and $R_2$ is alkylene of 1 to 12 carbon atoms.

A further class of distally perfluoroalkyl amines consists of compounds of the formula:

$$R_fWNH_2$$

wherein $R_f$ is perfluoroalkyl of 4 to 12 carbon atoms and W is a composite linking group. Structures of W which are suitable will be seen to include:

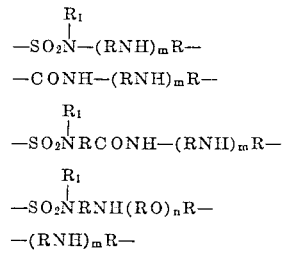

where $R_1$ is hydrogen or alkyl or 1 to 6 carbon atoms, R is alkylene of 2 to 12 carbon atoms, $m$ is a numeral, and $n$ is a positive integer less than about 50.

The numerical value of $m$ may be zero or a positive integer and in the case of amines derived from polyethyleneimine may be in the hundreds. It will be understood that in these cases the structure shown is intended to refer to the branched compounds as they exist and is not to be construed as limited solely to linear polyethyleneimine, although when $m$ has values of 8 to about 8 linear structures are intended. It will also be evident from the illustrative compounds set forth hereinbelow in the examples that each R group in the molecule may be selected individually, and thus they may be the same or different.

Those distallyperfluoroalkyl amines in which $R_1$ is other than hydrogen are generally available from corresponding carbinols by reaction of the benzene sulfonate ester with the appropriate diamine. It is a significant property of many of these amines that they behave as surfactants and dissolve very readily in water, or in the presence of a trace of acid, to give foamy solutions.

In general, compositions of the invention are prepared to comprise epoxy prepolymers and cross-linking agent in stoichiometric proportions of from about 2:1 to about 1:2.

Compositions of the invention containing nitrogenous bases as described above are broadly termed water-extended curable epoxy resin systems. They possess good pot-life approximately inversely to the concentration. In other words, more dilute systems generally last longer without reaction than more concentrated solutions. For many purposes, dilution of a composition found in practice to have somewhat too short pot-life with water readily increases the pot-life to a longer period. Generally compositions containing less than about 10 percent dry weight of solids have pot-lifes of over eight hours and hence are suitable for one-shift operations either for impregnation or coating. Compositions containing more than about 5 percent dry weight of solids are generally preferred for coating operations on webs to provide impervious finishes.

These compositions of the invention are particularly valuable as beater additives for paper making in which case they are most conveniently formed at dilutions usually below 5 percent dry weight in the presence of the cellulosic pulp and any filler. Under these circumstances the compatible curing agent and glycidyl ether appear to be absorbed from the resultant dilute suspension onto and into the fibers and filler particles. Heating of the paper thus prepared in subsequent operations results in further cure of the glycidyl ether.

Thus by employing the above-noted preferred subclass of nitrogenous curing agents even in amounts of the order of less than 5 percent by weight of the pulp and filler, substantial absorption is achieved and paper is obtained possessing unusual and desirable resistance to penetration by organic liquids such as fats and oils. Without wishing to be bound by any theory as to why absorption of the additive is so effective, it is nontheless remarkable inasmuch as the actual concentrations in the pulp suspension are extremely low.

Holdout as exhibited by paper products formed using these beater additives of the invention is readily observed; when an organic liquid is applied to the surface of the paper, instantaneous wetting is prevented and wetting and wicking by the liquid is delayed for greater or lesser periods of time or completely prevented.

In general these and other valuable properties are attained in my invention by using amounts of the additives or treating agents up to about 5% of the dry weight of the pulp. Those skilled in the art will readily appreciate that, practically, the amounts used will depend upon economics and the desired degree of effect sought. Thus, when fabrics are impregnated to improve hand, somewhat greater amounts of finishing solutions may be employed and for the production of oleophobic paper rather lower concentrations of adjuvants will be useful.

Oleopobicity of paper sheets is conveniently measured by means of "oil test kit ratings," determined as described herebelow and also by resistance to penetration at room temperature by lard oil or peanut oil (typical glyceride fatty oils) or motor oil (SAE 30, a typical hydrocarbon oil) used in place of turpentine in TAPPI grease-resistance test T–454–m–44 for flat sheets modified by empolying a weight atop the sand pile as in Joint Army-Navy Specification JAN–B–121 to assure contact. Grease resistance is also tested using the same oils in place of turpentine in test JAN–B–121. For ease in detection of penetration an oil soluble dyestuff is dissolved in each oil.

The holdout depends to some extent on the nature of the organic liquid employed and may vary from even a few seconds for a very low viscosity solvent up to days or weeks for oils such as motor oils, and even longer for thick thermoplastic materials. When prolonged holdout is required, e.g. butcher's wrapping paper and the like, higher concentrations of the combination of glycidyl ether and preferred fluorinated curing agent are used. However for operations where only short exposure to organic solvents is encountered, the incorporation of small amounts of the additive combination is very effective and avoids subsequent processing steps of the paper to provide suitable holdout. Thus, holdout as short as 15 seconds to a drop of acetone applied to the surface of the paper is very valuable in paper which is to be coated with a solution of material in acetone because in that time the acetone in the coating can be evaporated. Improvement in resistance to high humidity is also shown by paper having a finish of the invention.

Inasmuch as the oleophobicity conferred on paper by these compositions of the invention depends largely on the fluorinated amines, other dispersible epoxy resins may be employed in paper making together with the fluorinated amines to provide useful degrees of oleophobicity.

Having now described my invention in broad general terms, I now describe it by reference to particular examples showing the best mode presently contemplated of practicing the invention.

In order that the preparation of the glycidyl ethers of polyphenolic ethers of polyethylene glycols may be clear, I give a short description of the preparation of these.

*Example A*

The preparation of the glycidyl ethers is conveniently effected in three steps. These are shown herebelow for a polyethylene glycol having a molecular weight of about 300 (commercially available from the Union Carbide Corporation under the designation of glycol $E_{300}$). This yields a compound in which $n$ of the above general formula averages between about 6 and 7. These procedures are repeated using appropriate proportions with polyethylene glycols having molecular weights from about 200 to 2000 to provide other compounds in which $n$ averages from about 4 to about 45 respectively.

The first step is to make the bis-benzenesulfonate ester of the polyethylene glycol. The polyethylene glycol (1200 parts) is first mixed with a small amount (3.6 parts) of sodium borohydride and permitted to stand for 24 hours to effect reduction of chromogenic impurities. About 600 parts of toluene and 820 parts of anhydrous commercial grade triethylamine are added and then 1433 parts of redistilled benzene sulfonyl chloride are added gradually over about 3 hours while maintaining the temperature at about $25°\pm2°$ C. Stirring is continued for 24 hours at which time reaction is complete (no free triethylamine found on titration of an aliquot). The crystalline triethylamine hydrochloride is collected and washed with toluene and the filtrate and washes are neutralized by stirring for 3 hours with solid sodium bicarbonate. The dried solution is evaporated below about $45°$–$55°$ C. to give the bis-benzenesulfonate ester as a light amber-colored oil.

The second step converts the bis-benzenesulfonate ester to the ether with bisphenol A. To a solution of 165 parts of bisphenol A, 200 parts by volume of absolute ethanol and 175 parts of volume of 4 N methanolic sodium hydroxide, all under a stream of nitrogen, are added over about 1.5 hours 200 parts of the above bis-sulfonate. Residues of the ester in the addition funnel are rinsed into the reaction mixture with about 50 parts by volume of absolute ethanol and the reaction mixture is refluxed with stirring for 1.5 hours. The reaction mixture is cooled and filtered to remove sodium benzenesulfonate and the filtrate and washes evaporated. The residue is dissolved in methylene chloride, acidified and then neutralized with aqueous sodium bicarbonate. The organic phase is dried and concentrated to give a honey colored viscous resin comprising largely the bis(bisphenol A) ether of polyethylene glycol. It contains some unreacted bisphenol A.

In the third step the above bisphenolic compound is converted to the glycidyl ether by conventional procedures by reaction with epichlorohydrin in very large excess (50–100 times stoichiometric amount) by gradual addition of methanolic sodium hydroxide in about 25% excess. The glycidyl ether is taken up if desired with further solvent, e.g. methylene chloride, filtered to remove sodium chloride and evaporated to a transparent resin having an oxirane content of about 4.2%. This resin is found to disperse spontaneously in a few minutes when mixed with either hot or cold (room temperature) water. Resins having substantially this structure are hereafter referred to as the glycidyl ether of Example A ($E_{300}$).

Other polyethylene glycols lead to other glycidyl ethers, which are also found to disperse to latices when mixed into water, hereinafter referred to as above, indicating by the subscript number in the parentheses the approximate molecular weight of the polyethylene glycol employed in step 1. When resorcinol is employed instead of bisphenol A in the second step, the final glycidyl ether is found not to give autodisperse latices showing the nonobvious specificity of this behavior.

Evaporation under reduced pressure of the autodisperse latices prepared above yields the original glycidyl ether in unchanged form, that is having the same content of oxirane oxygen.

Example 1

This example particularly illustrates an embodiment of the invention which is adapted for but is not limited to preparing finishing compositions employing distally perfluoroalkyl amines having only terminal primary amine groups and free from other amine or amide groups reactive with oxirane groups. As noted hereinbelow this permits obtaining useful oleophobicity from relatively volatile simple amines having the general formula $R_fR_2NH_2$ where $R_f$ is as defined above and $R_2$ is alkylene of 1 to 12 carbon atoms.

A coating composition of the invention is prepared by reacting 2 parts of the glycidyl ether of Example A ($E_{300}$) with 0.08 part (10 percent of stoichiometric) of the N-ethyl perfluorooctanesulfonamide of ethylene diamine of the formula

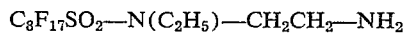

obtained as described in the application of Arthur H. Ahlbrecht, Serial Number 350,563. The reactants are heated together with agitation in a vessel held at about 85° C. for 1 hour. The resultant prepolymer can be described as essentially an ethoxyline prepolymer having pendent perfluoroalkyl groups or as a prepolymer in which two molecules of epoxy resin are joined by a linking aza group with pendent perfluoroalkyl group.

This type of polymer, prepared from the above type of epoxy resin, is found to be autodispersible and the prepolymer thus obtained above is dispersed in about 30 parts of water and 0.19 part of ethylene triamine are mixed in.

The resulting dispersion is further diluted to 45.5 parts by volume with water to give about 5 percent of total solids.. The solution is coated on unbleached softwood kraft paper at a rate to provide about 3.6 percent of fluorine in the dried paper and the paper is dried.

The oil test kit rating is determined on portions of the treated paper. The kit is a series of eleven solutions decreasing by increments of 10 percent by volume from 100 percent to 0 percent of castor oil diluted with a mixture of equal volumes of toluene and heptane in amount sufficient to give 100 percent. A twelfth solution of 55 percent heptane and 45 percent toluene may be used for extreme oleophobicity. The rating is the highest number solution which remains on the test surface for 15 seconds without penetration, i.e. wicking, feathering or darkening.

The paper coated in this example rates 3 indicating holdout for 15 seconds to a solution of 80 percent castor oil and 10 percent each of toluene and heptane. The paper is found to have a softer feel and greater flexibility than paper similarly treated with an emulsion of a conventional epoxy resin.

When other epoxy resins are substituted in this procedure for the epoxy resin of Example A, other useful prepolymers are obtained which differ largely in not being autodispersible. When dispersed using emulsifying agents and combined with diethylene triamine as ultimate curing agent, finishing solutions of the invention are obtained which confer comparable degrees of oleophobicity on paper. Other amines and curing agents for epoxy resins are substituted for diethylene triamine in preparing other finishing solutions with substantially similar results.

Example 2

This example illustrates the embodiment of the invention shown in Example 1 above in which a prepolymer is prepared using a distally perfluoroalkyl amine possessing a composite linking group having an aza-substituent.

A beater additive of the invention for paper manufacture is prepared by reacting 420 parts of the glycidyl ether of Example A ($E_{300}$) with 22 parts (about 10 percent of stoichiometric) of the N-ethyl perfluorooctanesulfonamide of diethylene triamine by heating together for 1 hour at 90° C. This prepolymer is autodispersed in warm water to give an about 10 percent solids autodisperse latex. To this autodisperse latex are added 24 parts of diethylene triamine and the resulting dispersion is employed as a beater additive.

Into 700 parts of water are added 4 parts of bleached sulfate wood pulp of about 40° SR freeness and after stirring for 5 minutes at medium speed in a Waring Blendor, 1 part of the above beater additive of the invention (10 percent solids) is added and agitation is continued for 15 minutes.

A sheet of paper 8 by 8 inches is cast using a laboratory hand sheet former. Very little of the additive passes into the white waters because there appears to be strong affinity for the pulp. The sheet is drained, pressed and dried. The dry sheet is found to have good water repellency and an oil test kit rating of 8 showing excellent oleophobicity. Creasing or calendering the sheet does not significantly decrease the oleophobicity. Paper prepared similarly but without the beater additive of the invention shows no holdout to oil, i.e. oil test kit rating of zero.

Another beater additive of the invention is made by reacting 92.5 parts of the glycidyl ether of Example A ($E_{412}$) with 3.0 parts of the N-ethyl perfluorooctanesulfonamide of ethylene diamine by dispersing at 25° C. in water. A Waring Blendor is charged with 600 parts of water and 4 parts of bleached kraft pulp is stirred in. To this suspension of pulp is added 1 part of the above beater additive which is beaten in, followed by 0.062 part of diethylene triamine and 5 parts by volume of 10% alum solution each of which is mixed in for 15 minutes. The alum flocculates the suspension. The pulp containing the additives is cast into a handsheet form and the handsheet is pressed out and dried at 250° F. for 30 minutes. It is not calendered and hence would normally be expected to be quite absorbent. It is found that when tested as above it has an oil test kit rating of 5.

Prepolymers prepared as described in the above examples are prepared containing up to about 30 percent of the stoichiometric amount of distally perfluoroalkyl amine and are useful in the formulation of so-called nylon-epoxy adhesives. These prepolymers may be employed as above with non-fluorinated amines or may also be employed with the balance of the stoichiometric amounts of the same or different distally perfluoroalkyl amines.

Example 3

A series of furnishes are prepared by the above procedure beating 4 parts of bleached softwood kraft pulp into 200 parts of water followed by 0.05 part of N-ethyl perfluorooctanesulfonamide of diethylene triamine, conveniently added as the hydrochloride, and 0.10 part of the glycidyl ether of Example A ($E_{412}$). Handsheets are cast from each furnish and drained, pressed and dried on a handsheet drier. Beating times are varied from about 5 minutes (considered to be just enough to effect mixing) up to 60 minutes and more. A heating cycle may be included in the preparation of the furnish as described above but appears to offer no advantages. In a further series the pH of the furnish is adjusted by additions of hydrochloric acid or ammonium hydroxide to values between pH 3 and 10 (e.g. 3, 4, 5, 6, 8, 9 and 10). The resulting handsheets all show substantial holdout to oil and solvents in the above oil test kit as shown by ratings of 8 to 10.

It should be noted particularly that beater additives that are effective with basic pulps are very desirable. Beater additives of the invention are thus found not only to confer the unusual property of oleophobicity but also to be useful without regard to the acidity or basicity of the pulp.

Example 4

A further series of paper furnishes are prepared as described in Example 3 above employing different water-dispersible compatible curing agents. In each case 4 parts of bleached kraft pulp is beaten into 200 parts of water followed by the amount of curing agent shown and then the amount (stoichiometric equivalent) of glycidyl ether of Example A ($E_{412}$) shown in the following table. The small amounts of glycidyl ether and curing agent are conveniently added by first preparing aqueous dispersions, e.g. autodisperse latices of the glycidyl ether and acidulated aqueous dispersions of the curing agents adding appropriate aliquots. The dilution effect on the pulp under such conditions is nil.

| Compatible curing agent | Parts of curing agent | Parts of glycidyl ether |
|---|---|---|
| $C_8F_{17}SO_2N(C_2H_5)$—$(CH_2CH_2NH)_3H$ | 0.06 | 0.13 |
| $C_8F_{17}SO_2N(C_2H_5)$—$CH_2CH_2NH$—$CH_2C_6H_4CH_2NH_2$ (meta) | 0.06 | 0.11 |
| $C_2F_{17}SO_2NH$—$CH_2CH_2NH_2$ | 0.05 | 0.125 |
| $C_8F_{17}SO_2NH$—$(CH_2CH_2NH)_2H$ | 0.055 | 0.585 |
| $C_8F_{17}SO_2N(C_2H_5)$—$CH_2CH_2NH$—$(CH_2)_6NH_2$ | 0.06 | 0.125 |

Handsheets are formed from each of the above furnishes and are dried as described in Example 3 above. Portions of each handsheet are rated by the oil kit test rating and are found to be oleophobic with ratings of about 7 to 9.

*Example 5*

A further series of handsheets are prepared using unbleached kraft pulp beaten to Canadian Standard Freeness 500± at about 0.3% concentration and pH of 7.8–8.0. An amount of fluorinated amine which is sufficient to provide at least about 0.25 percent of fluorine by weight of pulp is added in aqueous dispersion to the pulp followed by the water dispersible epoxy resin $E_{300}$ of Example A above which is employed in 40–60% excess over stoichiometric. Mixing is continued for about 10 to 15 minutes after addition is complete.

Handsheets are prepared as described above employing the above epoxy resin, as stated, and the following distally perfluoroalkyl amines; designated by letters for convenience in further reference:

(A) $C_4F_9SO_2NHC_2H_4NHC_2H_4NH_2$
(B) $C_{12}F_{25}SO_2NHC_2H_4NHC_2H_4NH_2$
(C) $C_8F_{17}SO_2NHC_2H_4NHC_2H_4NH_2$
(D) $C_8F_{17}SO_2NH$—$C_3H_6$—$NH$—$C_3H_6NH_2$
(E) $C_8F_{17}SO_2NHC_2H_4NH_2$
(F) $C_8F_{17}SO_2NH(CH_2)_6NH_2$ (G) $C_8F_{17}SO_2NHCH_2$—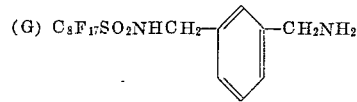—$CH_2NH_2$ (H) $C_7F_{15}CONHC_2H_4NHC_2H_4NH_2$
(I) $C_8F_{17}SO_2N(C_2H_5)$—$CH_2CONHC_2H_4NHC_2H_4NH_2$
(J) $C_8F_{15}SO_2N(C_2H_5)$—$CH_2CH_2NH_2$
(K) $C_8F_{17}SO_2N(C_2H_5)$—$CH_2CH_2NH(CH_2)_6NH_2$
(L) $C_8F_{17}SO_2N(C_2H_5)$—$CH_2CH_2NHC_2H_4NHC_2H_4NH_2$ (M) $C_8F_{17}SO_2N(C_2H_5)$—$CH_2CH_2NH$—$CH_2$—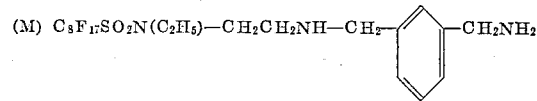—$CH_2NH_2$ (N) $C_8F_{17}SO_2N(C_2H_5)$—$CH_2CH_2NH(CH_2CH_2NH)_mH$
(O) $C_8F_{17}SO_2N(C_2H_5)$—$CHCH_2NH(CH_2)_3O(CH_2CH_2O)_2(CH_2)_3NH_2$
(P) $C_8F_{17}SO_2N(CH_3)$—$(CH_2)_{11}NH(CH_2)_6NH_2$
(Q) $C_8F_{17}(CH_2)_3NHC_2H_4NHC_2H_4NH_2$ These distally perfluoroalkyl amines are added as acidulated aqueous dispersions. It is found that very little acid such as hydrochloric is necessary to effect dispersion. The amount of this is insufficient to affect the pH of the pulp which is readily maintained at the desired pH.

When the above handsheets A through Q, are tested by the above-described oil test kit all are found to possess useful oleophobicity. In some cases greater oleophobicity may be observed on one side than the other of the sheet and in many cases the sheets are also found to possess significant hydrophobicity.

Further tests for oleophobicity are conducted in triplicate on handsheets C and D (representing unalkylated amide linking groups) and L and M (representing N-alkyl amide linking groups) testing both flat and creased sheets as described above for penetration of lard oil and/or motor oil. The average results over all show holdout of at least two weeks and in the cases of handsheet C up to about two months. Handsheets H and I tested similarly show resistance to lard and motor oil for over 7 days both flat and creased. Handsheet K shows holdout to lard oil for over 7 days flat and for 3 days creased. Handsheets P and Q show resistance to motor oil under these tests for 1 to 2 days. The superiority of paper prepared by the process of the invention is clearly evident in contrasting these results with the holdout to peanut oil of 30 minutes commonly considered to be excellent. Satisfactory oleophobicity for many purposes may be obtained by employing the distally perfluoroalkyl amines and epoxy resins in the present invention in amounts corresponding to about 0.20 percent of fluorine based on the dry weight of fiber (termed "O.W.F." in the above mentioned patent). Even greater oleophobicity is obtained by employing greater amounts of amines up to about 5 percent of fluorine O.W.F.

When the above described handsheets are tested for oleophobicity at intervals it is found that there is no loss in effectiveness. This shows the permanency of oleophobicity as distinguished from the duration of holdout.

For purposes of comparison, the water soluble hydrochloride of a fluorinated amine of the prior art, 1,1-dihydroperfluorohexylamine hydrochloride, is employed without an autodisperse latex of epoxy resin. It is found to be substantially not absorbed and when applied as a surface coating, its volatilizes within two days at room temperature so that it confers no permanent oleophobicity on paper to which applied. On the other hand when employed in the procedure of Example 1, above, it provides useful treating solutions for paper conferring useful oleophobicity. Homologous amines including those which are too volatile for use alone to give permanent oleophobicity, likewise are useful in that embodiment of the invention.

*Example 6*

A large batch of furnish is prepared from 50 pounds of oven-dry bleached kraft pulp (about 70% softwood and 30% hardwood) beaten for about 80 minutes in 166 gallons of water in a beater having steel tackle to a Shopper-Riegeler freeness of about 75. While agitation of the slurry is maintained, about 5 pounds of papermaker's kaolin at 15 percent solids in water is added followed by 0.50 pound of the perfluorooctanesulfonamide of diethylene triamine dispersed in about 2 gallons of warm water (about 100–110° F.) containing sufficient hydrochloric acid to bring the pH of the solution to about 3.5 and an autodisperse latex of 0.50 pound of the glycidyl ether of Example A ($E_{300}$) in about 2 gallons of cold water. Agitation is continued and the above suspension is diluted with a further 464 gallons of water followed by one pound of cationic starch (available commercially under the registered trademark Cato 8 from National Starch and Chemical Corp., and believed to be produced in accordance with some of U.S. Patents Number 2,813,093; 2,825,727; 2,917,506; 2,935,436 and 2,989,520) as 2 percent solids suspension in water (adjusted to pH 3.5 with hydrochloric acid and then cooled at 195° F. for 15 minutes). The resulting slurry is then brought from pH of 7.5 to pH 5.7 with hydrochloric acid. There is thus obtained a paper-maker's furnish of the invention.

The above furnish is transferred to the stock chest of a Fourdrinier machine and diluted with water (after the run has started using white water for dilution and maintaining a closed system) to about 0.42 percent dry solids in the head box and run onto the wire of the machine. The wet web from the wire is handled in conventional paper-making manner over a suction couch roll, transferred to a felt and then to two press sections and a drying section and then through a light calendering operation. The resulting paper (500 yards, 24 inches wide; designated Lot I) has a basis weight of 17.9 pounds for 24 x 36 sheets in a 480 ream, a caliper of 1.9 mils, tensile strength of 5.1 and 9.9 pounds per inch in cross and machine directions. Gurley densimeter test is 225 seconds for 400 cc. of air. Holdout to motor oil as described above is found to be more than two weeks flat and about 6 days creased. Oil test kit rating is 8.

Other batches of paper (lots 2 and 3) are prepared by the above procedure, and in the same weight ratios, using other compatible curing agents and one other batch (lot 4) is prepared in which the clay is omitted. The characteristics of these furnishes and the resultant papers are shown in the following table in which the curing agents employed are as follows:

Lot 2—$C_8F_{17}SO_2N(C_2H_5)$—$CH_2CH_2NH$—$(CH_2)_6NH_2$
Lot 3—$C_8F_{17}SO_2N(C_2H_5)$—$(CH_2CH_2NH)_3H$
Lot 4—$C_8F_{17}SO_2NH$—$(CH_2CH_2NH)_2H$

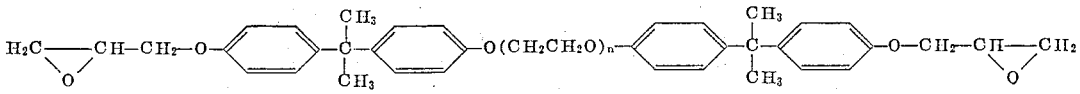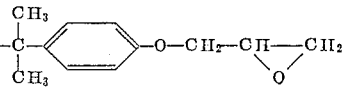

| Lot | 2 | 3 | 4 |
|---|---|---|---|
| pH of furnish | 6.4 | 6.5 | 6.3 |
| Basis of weight of paper | 19.8 | 16.8 | 17.9 |
| Caliper of paper | 2.2 | 2.0 | 2.1 |
| Tensile strength, in cross direction | 6.1 | 4.1 | 4.6 |
| Tensile strength, in machine direction | 8.9 | 8.5 | 8.3 |
| Gurley densimeter test | 592 | 192 | 208 |
| Holdout to motor oil in days: | | | |
| Flat | >21 | (¹) | (¹) |
| Creased | >21 | (¹) | (¹) |
| Oil test kit rating (flat) | 7 | 7 | 8 |

(¹) Paper too thin to give meaningful results in this test.

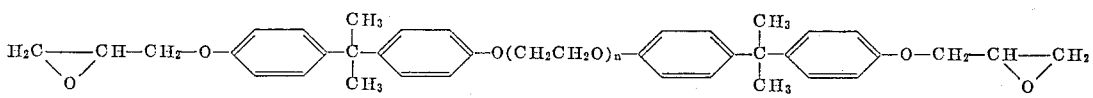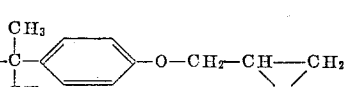

*Example 7*

This example illustrates a textile finishing composition of the invention in which a catalyst is employed.

To an autodisperse latex of 3 parts of the glycidyl ether of Example A ($E_{300}$) in 50 parts of water is added 0.5 part of a 40 percent aqueous solution of zinc fluoroborate. Cotton cloth is impregnated with the resultant solution and squeezed out so that there is about 100 percent pick up. The cloth is dried and heated at about 250° F. for 20 minutes to effect homopolymerization of the glycidyl ether. The finished cloth is found to have a good hand and significant crease-resistance.

*Example 8*

In another example a nitrogenous base is employed in a composition such as that of Example 7 above.

To an autodisperse latex of 8 parts of the glycidyl ether of Example A ($E_{300}$) in 500 parts of water are added 3 parts of the water-dispersible dihydrazide of the polyethylene glycol (of molecular weight about 300) bis ether of p-hydroxy benzoic acid. (Available as described in the copending application Serial Number 350,524 of Carl M. Smith) and about 0.01 part of 40% zinc fluoroborate in water. The mixture is heated at 75° C. for two hours to permit prepolymer formation and is then used to finish cotton cloth as above. The impregnated cloth is heated at about 300° F. for 30 minutes after drying and then has improved hand and crease-resistance. Increasing the amount of catalyst to about 0.5 percent of the weight of finishing agents markedly decreases the time necessary for curing.

What is claimed is:

1. An autodisperse latex adapted to finishing operations for essentially organic materials in sheet form comprising glycidyl ether of the formula:

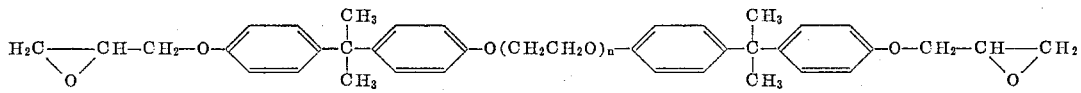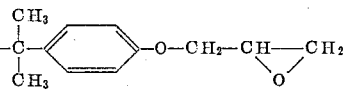

wherein $n$ is a number from about 4 to about 45, and water.

2. A treating solution for fibrous materials comprising, in combination in aqueous dispersion,
   (A) autodispersible glycidyl ether of poly(bisphenol A) ether of polyethylene glycol of the formula:

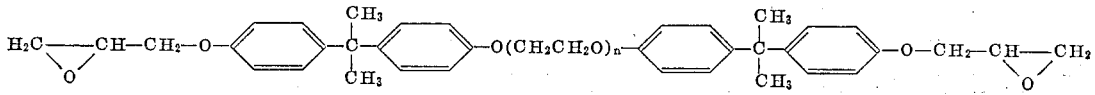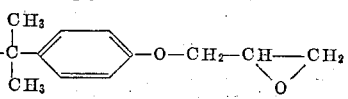

wherein $n$ is a number from about 4 to about 45, and
   (B) compatible, water dispersible curing agent for epoxy resin.

3. A treating solution for fibrous materials comprising, in combination in aqueous dispersion
   (A) autodispersible glycidyl ether of poly(bisphenol A) ether of polyethylene glycol of the formula:

wherein $n$ is a number from about 4 to about 45, and
   (B) compatible, water dispersible nitrogenous organic base curing agent for epoxy resin.

4. A treating solution for conferring oleophobicity on fibrous materials comprising, in combination in aqueous dispersion
   (A) autodispersible glycidyl ether of poly(bisphenol A) ether of polyethylene glycol of the formula:

wherein $n$ is a number from about 4 to about 45 and
(B) distally perfluoroalkyl amine.

5. A treating solution for fibrous materials comprising in aqueous dispersion,
(I) the reaction product of
(A) glycidyl ether of poly(bisphenol A) ether of polyethylene glycol of the formula

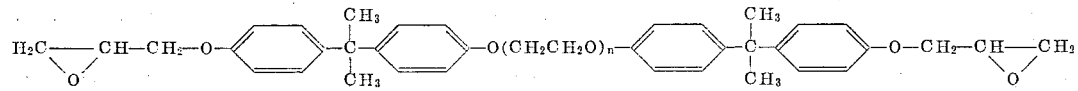

wherein $n$ is a number from about 4 to about 45,

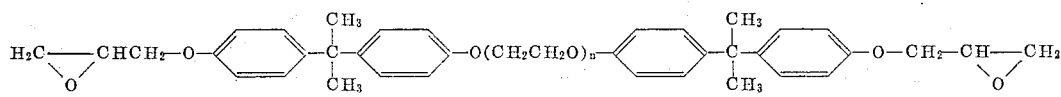

and
(B) up to about 30 percent of the stoichiometrically reactive amount of said glycidyl ether of distally perfluoroalkyl amine and
(II) nitrogenous organic base in an amount substantially stoichiometrically reactive with said reaction product.

6. As a composition of matter, the aqueously autodispersible reaction product of
(I) glycidyl ether of the formula:

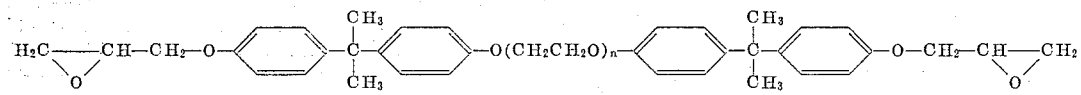

wherein $n$ is a number from about 4 to about 45 and
(II) up to about 30 percent of the stoichiometrically reactive amount of distally perfluoroalkyl primary amine having a divalent linking group connecting the primary amine group and the perfluoroalkyl group,

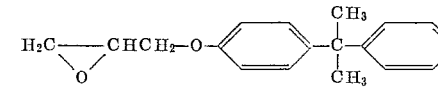

said divalent linking group consisting of at least one divalent radical selected from the group consisting of alkylene of 1 to 12 carbon atoms, aralkylene of 8 carbon atoms, oxa, unsubstituted aza, carbonamido, unalkylated sulfonamido and N-alkyl-sulfonamido, at least one of said radicals being alkylene and not more than one being aralkylene, not more than two

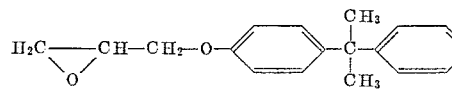

of said radicals comprising amide linkages, and sulfonamido groups, when present, having the sulfur atom distally located in said divalent radical relative to the attachment of said primary amine group.

7. A process for finishing fibrous organic material comprising the step of contacting said material with aqueous dispension of
(A) autodispersible glycidyl ether of poly (bisphenol A) ether of polyethylene glycol of the formula:

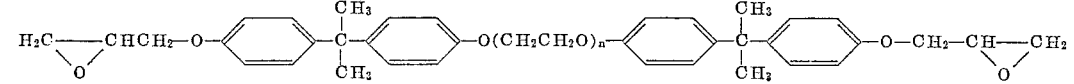

wherein $n$ is a number from about 4 to about 45 and
(B) compatible, water dispersible curing agent for epoxy resin.

8. A process for finishing fibrous organic material in sheet form comprising the step of applying to at least one surface thereof an aqueous dispersion of
(A) autodispersible glycidyl ether of poly(bisphenol A) ether of polyethylene glycol of the formula:

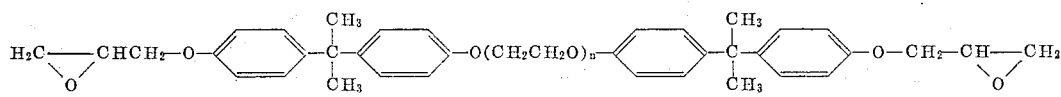

wherein $n$ is a number from about 4 to about 45, and
(B) compatible, water dispersible curing agent for epoxy resin.

9. A process for finishing organic material in sheet form comprising the step of applying to at least one surface thereof an aqueous dispersion of
(A) autodispersible glycidyl ether of poly(bisphenol A) ether of polyethylene glycol of the formula:

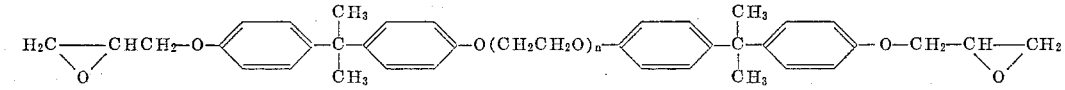

wherein $n$ is a number from about 4 to about 45, and

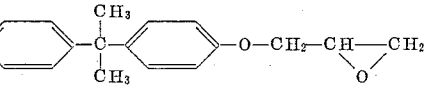

(B) distally perfluoroalkylamine.

10. A process for producing paper having holdout to fluid and semi-solid organic liquids comprising the steps of coating said paper with an aqueous dispersion of:
(A) autodispersible glycidyl ether of poly(bisphenol A) ether of polyethylene glycol of the formula:

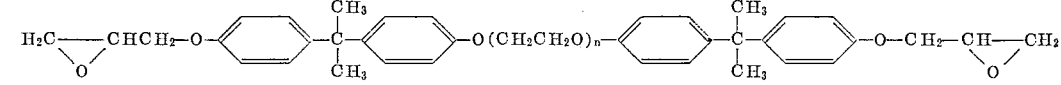

wherein $n$ is a number from about 4 to about 45, and
(B) distally perfluoroalkylamine, and thereafter removing water from the coated paper obtained.

11. Paper containing as an oleophobicity conferring constituent an effective amount up to about 5 percent of an autodispersible glycidyl ether of the formula:

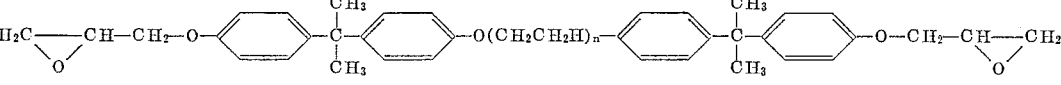

wherein $n$ is a number from about 4 to about 45, in chemical combination with distally perfluoroalkyl amine.

12. A process for the production of oleophobic paper from cellulose fibers according to claim 7, comprising the step of interreacting, in the presence of said fibers in aqueous paper-forming suspension

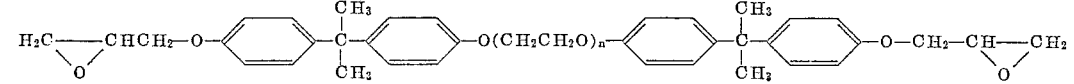

(A) dispersed epoxy resin of the formula:

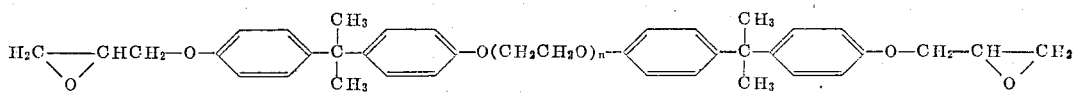

wherein $n$ is a number from about 4 to about 45 and (B) distally perfluoroalkylamine.

13. A process for the production of oleophobic paper from cellulose fibers according to claim 12, comprising the steps (A) stirring said fibers in aqueous paper-forming suspension containing added reactive dispersed epoxy resin of the formula:

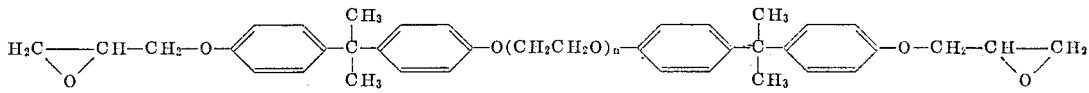

wherein $n$ is a number from about 4 to about 45, and distally perfluoroalkyl amine curing agent for epoxy resin in substantially stoichiometric proportions for a time sufficient to effect substantial interreaction between a precipitation of said epoxy resin and (B) continuously forming paper from said suspension while recyling white waters.

14. A process for rendering water-insoluble solid material oil repellent which comprises treating said material with an aqueous bath containing (A) an epoxy resin of the formula:

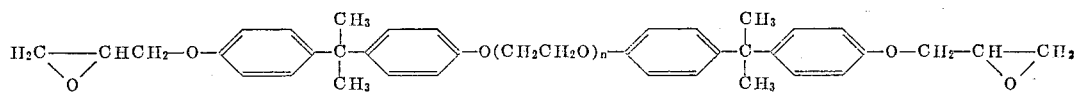

wherein $n$ is a number from about 4 to about 45 and (B) a solubilized distally perfluoroalkyl amine.

15. A cellulosic paper stock characteristized by repellency to organic oils comprising as adjuvant the reaction product in substantially stoichiometric proportions of autodispersible glycidyl ether of the formula:

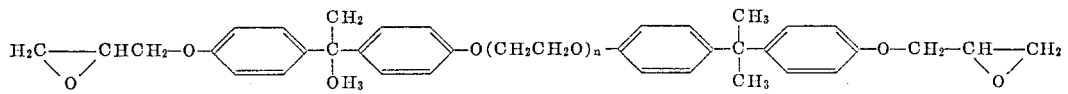

wherein $n$ is a number from about 4 to about 45, and distally perfluoroalkyl amine.

References Cited by the Examiner
UNITED STATES PATENTS

| | | | |
|---|---|---|---|
| 2,668,807 | 2/1954 | Greenlee | 260—47 |
| 2,772,248 | 11/1956 | Lieberman et al. | 260—29.2 |
| 2,829,164 | 4/1958 | Rocklin | 260—47 |
| 2,872,428 | 2/1959 | Schroeder | 260—29.2 |
| 3,145,191 | 8/1964 | Perfetti | 260—47 |

MURRAY TILLMAN, *Primary Examiner.*

SAMUEL H. BLECH, *Examiner.*

J. C. BLUETGE, *Assistant Examiner.*